United States Patent
Tazarine et al.

(10) Patent No.: US 11,643,033 B2
(45) Date of Patent: May 9, 2023

(54) MOTOR VEHICLE ELECTRICAL SYSTEM AND VEHICLE WITH A MOTOR VEHICLE ELECTRICAL SYSTEM

(71) Applicant: Auto-Kabel Management GmbH, Hausen im Wiesental (DE)

(72) Inventors: Wacim Tazarine, Erkelenz (DE); Frank Gronwald, Bedburg (DE); Simon Betscher, Grevenbroich (DE)

(73) Assignee: Auto-Kabel Management GmbH, Hausen im Wiesental (DE)

( * ) Notice: Subject to any disclaimer, the term of this patent is extended or adjusted under 35 U.S.C. 154(b) by 240 days.

(21) Appl. No.: 16/327,489

(22) PCT Filed: May 11, 2017

(86) PCT No.: PCT/EP2017/061249
§ 371 (c)(1),
(2) Date: Feb. 22, 2019

(87) PCT Pub. No.: WO2018/036670
PCT Pub. Date: Mar. 1, 2018

(65) Prior Publication Data
US 2019/0184922 A1    Jun. 20, 2019

(30) Foreign Application Priority Data
Aug. 25, 2016   (DE) ..................... 10 2016 115 823.2

(51) Int. Cl.
*B60R 16/033*    (2006.01)
*H02J 7/14*    (2006.01)
(Continued)

(52) U.S. Cl.
CPC ............ *B60R 16/033* (2013.01); *B60L 58/18* (2019.02); *B60L 58/21* (2019.02);
(Continued)

(58) Field of Classification Search
CPC ... B60R 16/033; B60R 16/03; B60R 16/0207; H02J 1/10; H02J 7/1423; H02J 2310/46;
(Continued)

(56) References Cited

U.S. PATENT DOCUMENTS 5,818,673 A * 10/1998 Matsumaru ............... H02J 9/06
361/63
6,552,443 B1    4/2003 Johnke et al.
(Continued)

FOREIGN PATENT DOCUMENTS

DE    19916452 A1 * 10/2000 ......... B60R 16/0315
DE    19916452 A1    10/2000
(Continued)

*Primary Examiner* — Pinping Sun
(74) *Attorney, Agent, or Firm* — The Webb Law Firm

(57) ABSTRACT

Motor vehicle on-board network having at least two main line strands arranged electrically parallel to one another, the main line strands being electrically short-circuited to one another in two regions which are separated from one another and having a connection for one of at least two on-board network power supplies in each case, at least one motor vehicle on-board network being arranged in the at least two main line strands interrupting the respective main line strand, the motor vehicle electrical system switching network having at least three switches, a first switch being arranged between a first main line connection and a common node, a second switch being arranged between a second main line connection and the common node, and a third switch being arranged between the common node and at least one load connection.

16 Claims, 3 Drawing Sheets

(51) Int. Cl.
  *B60L 58/18* (2019.01)
  *H02J 1/10* (2006.01)
  *B60R 16/03* (2006.01)
  *B60L 58/21* (2019.01)
  *B60R 16/02* (2006.01)

(52) U.S. Cl.
  CPC .......... *B60R 16/0207* (2013.01); *B60R 16/03* (2013.01); *H02J 1/10* (2013.01); *H02J 7/1423* (2013.01); *B60L 2210/10* (2013.01)

(58) Field of Classification Search
  CPC ...... H02J 2310/48; B60L 58/21; B60L 58/18; B60L 2210/10; Y02T 10/70
  See application file for complete search history.

(56) References Cited

U.S. PATENT DOCUMENTS

| | | | |
|---|---|---|---|
| 7,095,134 | B2 | 8/2006 | Sauer et al. |
| 7,474,015 | B2 * | 1/2009 | Enders ................ B60R 16/0315 307/10.1 |
| 7,999,408 | B2 | 8/2011 | Fehr et al. |
| 8,674,823 | B1 * | 3/2014 | Contario ................... H02J 1/10 340/693.1 |
| 9,614,585 | B2 * | 4/2017 | Katar ....................... B60L 53/65 |
| 10,313,139 | B2 * | 6/2019 | Dwelley ........... H04L 12/40045 |
| 2004/0227402 | A1 | 11/2004 | Fehr et al. |
| 2009/0043450 | A1 * | 2/2009 | Tonegawa ................ B60L 3/00 701/36 |
| 2011/0018441 | A1 * | 1/2011 | Tanaka ................... H05B 47/22 315/82 |
| 2013/0026988 | A1 * | 1/2013 | Igata ................ H02J 13/00034 320/109 |
| 2013/0119947 | A1 * | 5/2013 | Ishida ..................... B60L 53/65 320/162 |
| 2016/0160828 | A1 * | 6/2016 | Betscher ................. B60R 16/03 307/10.6 |
| 2017/0113637 | A1 * | 4/2017 | Mueller ..................... H02J 1/12 |
| 2017/0217327 | A1 * | 8/2017 | Strobel ............... H01M 50/296 |
| 2017/0257167 | A1 * | 9/2017 | Adams ..................... H01Q 5/22 |

FOREIGN PATENT DOCUMENTS

| | | | | |
|---|---|---|---|---|
| DE | 10009775 | A1 | 10/2001 | |
| DE | 10317362 | A1 | 11/2004 | |
| DE | 10317362 | A1 * | 11/2004 | ......... B60R 16/0315 |
| DE | 10329914 | A1 | 2/2005 | |
| DE | 102005005236 | A1 | 8/2006 | |
| DE | 102012207624 | A1 * | 11/2013 | ........... B60L 3/0076 |
| DE | 102012207624 | A1 | 11/2013 | |
| DE | 102015101235 | A1 | 7/2016 | |
| DE | 102015101247 | A1 | 7/2016 | |
| DE | 102015111881 | A1 | 1/2017 | |
| DE | 102016101855 | A1 * | 8/2017 | |
| EP | 1044851 | A2 | 10/2000 | |
| EP | 0800254 | B1 | 11/2003 | |
| EP | 1591320 | A1 | 11/2005 | |
| JP | 2002373529 | A | 12/2002 | |
| JP | 2004306848 | A * | 11/2004 | ........... H04L 12/403 |
| JP | 2004306848 | A | 11/2004 | |
| WO | 2004103771 | A2 | 12/2004 | |
| WO | WO-2007079878 | A1 * | 7/2007 | ............... H02B 1/24 |
| WO | WO-2013011449 | A2 * | 1/2013 | ........... H01B 13/106 |

* cited by examiner

MOTOR VEHICLE ELECTRICAL SYSTEM AND VEHICLE WITH A MOTOR VEHICLE ELECTRICAL SYSTEM

CROSS-REFERENCE TO RELATED APPLICATIONS

This application is the United States national phase of International Application No. PCT/EP2017/061249 filed May 11, 2017, and claims priority to German Patent Application No. 10 2016 115 823.2 filed Aug. 25, 2016, the disclosure of each of which is hereby incorporated by reference in its entirety.

BACKGROUND OF THE INVENTION

Field of the Invention

The subject-matter relates to a motor vehicle electrical system and a motor vehicle with a motor vehicle electrical system.

Description of Related Art

The share of electric vehicles (EV), be it hybrid electric vehicles (EHV), battery electric vehicles (BEV) or fuel cell vehicles (FCV), will increase rapidly in the future. In electric vehicles, an electric drive motor, also known as a traction motor, is fed by the electrical power supplies installed in the vehicle. The electrical energy for the traction motor can come from a generator or from electrical energy storage devices, e.g. accumulators. The power supplies are electrically connected to the traction motor via suitable circuits, for example via DC/DC converters or AC/DC converters. These connection concepts can be part of the switching system in question.

The acceptance of electromobility is crucially dependent on the reliability of such electric vehicles. Failures of drives will be hardly tolerated by the users. This problem becomes increasingly virulent when electric vehicles are used as autonomously operated vehicles. The trend towards autonomously driving cars is unbroken and leads to further questions regarding reliability.

SUMMARY OF THE INVENTION

For this reason, the subject-matter was based on the object of providing a vehicle electrical system which satisfies increased safety requirements, in particular with regard to reliability.

To solve this problem, a motor vehicle electrical system and a motor vehicle are proposed.

The vehicle electrical system has at least two main line strands arranged electrically parallel to each other. A main line strand can preferably carry the electrical high side potential of the energy storage device. The main line strands can also be surrounded by insulation. In a main line strand, two individual line strands insulated from each other can be arranged, in particular a low-side (ground) line and a high-side line. The wiring of the main and cross line strands described in the following preferably refers to the high side line. The main line strands preferably run electrically parallel to each other and each connect two separately operated on-board power supplies.

The main line strands are electrically short-circuited in at least two areas. Direct connections between the main line strands may be formed. Based on these connections, a connection line to one pole of each of the two on-board power supplies can branch off. The main line strands are thus both connected to both on-board power supplies, preferably at the same electrical potential.

Thus, the main line strands represent two redundant connections to the on-board power supplies. It has been found that this can considerably increase reliability. Each load connected to the on-board power supplies via the main line strands is thus redundantly supplied with electrical energy from the two on-board power supplies. The failure of one of the two on-board power supplies or the damage to one main line can be compensated by the other on-board power supply or the other main line.

The two main line strands also ensure that in normal operation the power loss between a load and the on-board power supply is reduced, as the electrical currents are conducted via both main line strands and the line resistance is thus reduced compared to a single line. On the other hand, compared to a single line, the line cross-section of each main line can be reduced with the same power loss.

It has turned out that not only redundancy, but also increased security requirements such as fault protection are relevant. In particular, it is important for reliability to be able to disconnect sources of error, e.g. any short circuits, from the motor vehicle electrical system without hindering the continued operation of the vehicle. For this purpose, a vehicle electrical system switching network is provided in the vehicle electrical system, via which a load is connected to one main line strand respectively. The main line strands are preferably mechanically, but in particular electrically switchable interrupted by at least one vehicle electrical system switching network. The vehicle electrical system switching network can be a switchable connection along a main line strand as well as between the main line strand and a load.

It is proposed for this purpose that at least one motor vehicle electrical system switching network is arranged in the at least two main line strands, in particular switchably interrupting the respective main line strand, the motor vehicle electrical system switching network having at least three switches.

According to the subject matter, a first switch is provided between a first main line strand terminal and a common node. A second switch is provided between a second main line strand terminal and the common node. The common node may be an electrically short-circuited conductor connected to the outputs of the two switches connected to each of the power supplies. The switches are arranged in such a way that they can be connected to the respective on-board power supplies on the input side. On the output side of the switches, these are short-circuited via the common node.

Starting from common node an electrical connection leads to a load. A third switch is provided in this line between the common node and the load. The load can preferably be connected to a load connection, which can be arranged on the output side of the third switch.

The switches can be switched on and off via corresponding control commands. Normally, one of the power supplies is used for the operation of the load. A second power supply provides the load with a redundant power supply. In order to exclude parasitic current flows between the two power supplies, a switch is provided for each of the power supplies. This can be used to prevent compensating currents from flowing between the power supplies.

In addition, it is necessary for safety reasons to be able to disconnect the energy supply from the load. For this reason, the third switch is provided, which is located between the common node and the terminal for the load.

During operation, the redundant switching system works in such a way that the third switch is usually opened for a disconnection of the load.

Loads in the sense of the subject matter are e.g. the traction motor, servo motors for the steering, the brake unit or other safety-relevant loads. The first two switches provide a two-channel power supply for a load.

An autonomously operated motor vehicle can also be equipped with a vehicle electrical system according to the subject matter. Due to the autonomy of driving, protection against failures, especially of the drive train or other safety-critical loads, is particularly important. When driving autonomously, the driver no longer intervenes in the driving process and an error at critical loads such as the drive train, the brake system etc. can lead to considerable accident risks due to the lack of monitoring by the driver. These must be avoided. Not only the drive train, but also all other safety-critical loads must preferably be redundantly protected. These include, for example, the steering system, in particular the servo motor for the steering system or the brake unit, as well as all other loads that can lead to a safety-critical condition in the event of a failure.

With the help of the switching system according to the subject matter it is possible to increase the reliability of the load considerably. A clever arrangement of a number of switches between the power supplies and the load increases reliability.

A status sensor can be provided at each switch to monitor the status of the respective switch. At the third switch it can be monitored if in the disconnected state the switch is actually open. This ensures that the load is disconnected from the power supplies.

However, if it is found that the switch does not open properly despite an open command, for example because it is stuck or welded, a control command can open the first and second switches. This also separates the power supplies from the load. The resulting switching concept offers redundancy in the separation of the load from the energy supplies.

In driving mode, the third switch is usually always closed. In addition, at least one of the power supplies is electrically connected to the load. For this purpose, either the first or the second switch is closed by means of a switching command. Energy thus flows from one of the power supplies via the respective switch to the load. If it is determined that the switch to be closed has not been closed or that the current flow between the load and the power supply has collapsed, although the load is still to be controlled, which happens, for example, if the power supply connected to the load is defective, a control signal can be generated for the other switch with which it is closed and the load is supplied with electrical energy via the other power supply. This leads to a considerably higher reliability, as the load can always be connected to one of the two power supplies.

It is also possible to close both switches between the node and the respective power supplies during operation. This enables a compensating current between the power supplies. For example, a first power supply may have a generator. This generator can charge the second power supply, e.g. an accumulator, via an optional converter, e.g. an AC/DC converter or a DC/DC converter and the switching system.

Due to the two main line strands, it is also possible to compensate for the failure of an entire vehicle electrical system switching network and an additional vehicle electrical system power supply. In this case, a supply current can flow to a load on a first main line via e.g. the entire second main line and then via the remaining first main line to the load.

According to an embodiment, it is proposed that at least one of the main line strands be composed of at least three line sections, at least one of the line sections being located between two vehicle electrical system switching networks.

The line sections are separate components arranged between the vehicle electrical system switching networks. The line sections form, section by section, a main line strand.

Each line section can, for example, be formed as insulated single or two-core cables. The line sections may preferably be connected to the main line terminals of the vehicle electrical system switching networks. Electric current preferably flows from an on-board power system energy storage via the region of a first short-circuit between two main line strands to a first motor vehicle electrical system switching network and from there respectively via a line section to a next motor vehicle electrical system switching network up to the region of the second short-circuit between the main line strands and from there optionally to the second on-board power system energy storage. Preferably, however, depending on the switch position, the electrical current flows only from an on-board energy storage device to a load via the line sections.

In order to be able to supply redundantly all loads connected to a main line strand which are each connected via a vehicle electrical system switching network, it is proposed that the main line strands are short-circuited in the area of their respective distal ends. Such an electrical short-circuit can in particular be caused by a mechanical connection between the conductors of the main line strands. An outlet to an on-board energy storage can be arranged in the area of this connection. The short circuit between the main line strands can also be formed directly in a connection part for an on-board energy storage. Such a connector can preferably be a battery terminal.

The respective distal ends of the main line strands can preferably be flexible cables, especially round cables. These can be routed from the two main line strands preferably to crimp terminals of a battery terminal or other connecting parts and can be connected mechanically as well as electrically to each other and to the connecting part.

Between the respective main line terminal of the vehicle electrical system switching networks, the line sections can be formed as round or flat conductors. The line sections can be made of aluminium material or copper material. The line sections can be formed by a cable with a cable core of copper or aluminium material and insulation. The cable core is preferably formed from a solid material, but can also be formed in individual line sections from a stranded conductor with a plurality of strands.

The line sections may be provided at their respective distal ends with connecting parts with which they can be connected to the main line terminal of the vehicle electrical system switching networks. In particular, these can be connection consoles for screwing the line sections to the respective connections.

According to an embodiment, it is proposed that at least one vehicle electrical system switching network has at least one fourth switch between a cross-line strands and the common node. As already mentioned, the main line strands are short-circuited in at least two areas. Starting from these areas, the main line strands are connected to the respective on-board power supplies. However, in order to ensure further increased reliability, the main line strands can also be connected to each other at least once during their course.

Cross lines can be provided for this purpose, which can be connected electrically to the main line or lines via the fourth switch.

The cross lines can thus be used to establish electrically switchable connections between the two main line strands in their course. These connections lead to the fact that even in the event of failure of several vehicle electrical system switching networks, the supply of the loads not connected to them can be guaranteed. The electrical current can be "routed" to the load via the respective main line strands by a suitable switching of the first, second and fourth switches.

To control the respective switches, it is necessary to know the control input variables. Such control input variables can, for example, be measured directly on the respective main line strands and/or the vehicle electrical system switching networks by means of sensors arranged inside or on them. For example, temperature, current and/or voltage can be measured by suitable sensors. If a short circuit occurs at a load, the voltage in the vehicle electrical system switching network assigned to this load, for example, collapses immediately, which can be measured by a suitable sensor. Then the third switch can be opened immediately, even without external intervention. It is also possible for a central control unit to record the sensor values and from these determine a state of the vehicle electrical system and control the switches appropriately.

In addition to the quantities mentioned, it is also possible to record load states and expected values for loads. Expected values for loads can be parameterized and indicate, for example, how high a certain amperage of a load is. If this amperage is exceeded, a faulty operation of the load can be inferred.

In addition, charging states of the on-board power supplies, vehicle states or crash signals can be recorded and processed in a central computer, for example. Depending on the condition of the vehicle, it may make sense to exclude individual loads from the energy supply or to increase redundancy at other loads. For example, individual loads can be disconnected from the vehicle electrical system by opening the third switch of the respective vehicle electrical system switching network, or cross-connections between the main line strands can be specifically established by closing the fourth switches in order to increase the supply reliability of individual loads.

In order to connect the main line strands with each other, the cross lines are provided. These are connected to the cross-line terminals of the respective vehicle electrical system switching networks according to an embodiment. Such a connection can also be made via suitable connection terminals. Depending on the space requirements, the cross-line strands can be made of round or flat cables, flexible or rigid.

According to an embodiment, it is proposed that the main and the cross lines form a distribution network, preferably fully meshed, at least in part. As already explained, cross connections between the main line strands can be formed by the cross lines. The cross connections are switchable via the fourth switch. The main line strands can be interrupted by the first and second switches on the vehicle electrical system switching networks. By appropriately opening and closing the first, second and fourth switches, any paths within the vehicle electrical system can be switched, so that the connection between the vehicle electrical system power supplies and the loads can be set individually. Then we can speak of a meshed distribution network.

According to an embodiment, it is proposed that at least one of the line sections and/or at least one of the cross line strands is formed as a flat cable, in particular from a flat cable made of a solid material, in particular from a copper material or an aluminium material.

According to an embodiment, it is proposed that the switches be individually controllable. Thus it is possible that each individual vehicle electrical system switching network with an individual control circuit is connected with a control computer. It is also conceivable that at least two, preferably all, vehicle electrical system switching networks are connected to each other via a bus line. The bus line is preferably also formed in a meshed structure and as a meshed ring. The bus line is preferably connected to the central control computer and the bus line can be used to control each vehicle electrical system switching network or each individual switch installed in it individually. The sensor signals from the sensors of the vehicle electrical system switching networks as well as from the sensors arranged on the main line strands can also be routed via the bus line.

It is also possible for the signals to be transmitted via the vehicle electrical system itself. For this purpose, it is proposed that at least one of the main line strands is coupled to a communication device, the communication device transmitting switching commands for at least one of the switches to the main line. Preferably, both main line strands are coupled with the communication equipment, so that the communication is also redundant as well as the electrical supply. Via the main line strand, for example, pulse width modulation, particularly in the form of a powerline communication, can be used to control the respective vehicle electrical system switching networks. Sensor signals and states of the vehicle electrical system switching networks can also be transmitted via the vehicle electrical system to and from the communication devices.

According to an embodiment, it is proposed that at least one of the on-board power supply systems is formed as an energy storage device, in particular as a battery or accumulator. On the other hand, it is also possible that at least one of the on-board power supplies is formed as a DC/DC converter or generator. In particular, the at least two on-board power supplies can be different from each other.

The load terminal is preferably intended for the connection of a load via a single power cable. In particular, one load terminal can be connected to exactly one load.

In this context, it should be noted that a vehicle electrical system switching network may have at least two or even more third switches. Two or more loads can be individually connected to one main line strand each via a third switch via a vehicle electrical system switching network.

The switches are preferably designed as semiconductor switches or relays, especially as so-called PROFETS. The current carrying capacity of the first and second switches and possibly the fourth switch is preferably higher than the current carrying capacity of a third switch. The currents flow via the first and second switches and possibly the fourth switch in particular to many loads arranged in the vehicle electrical system, and via the third switches only the current flows to the connected loads. Thus it is proposed that the current carrying capacity of the first and second switch is higher than the current carrying capacity of the third switch.

According to an embodiment, it is proposed that the vehicle electrical system switching network is installed in a common housing. In this respect, it is proposed that the switches are arranged in a common housing and that electrical connections are provided on the housing for the main line terminals, the load terminals and, if necessary, for the cross line terminals. The switches including electronic control can be installed in the housing. The housing can encapsulate the switching system from the rest of the vehicle electrical system. The cables can be connected to the respective power supplies or to the load via appropriate terminals, such as contact lugs.

It is also proposed that at least parts of the switches are arranged on a common printed circuit board. In this case, electronic components, such as semiconductor components, in particular semiconductor switches, can preferably be arranged on a printed circuit board and controlled via suitable control electronics. This allows the entire redundant switching system to be implemented on a compact module, which can preferably be installed in a common housing, in particular encapsulated.

The switches are preferably reversible and therefore differ from conventional fuses, which can only be switched once. The switches can be switched on and off often, ensuring that the redundant switching system operates over the life of the vehicle.

According to an embodiment, the switches are semiconductor components, as explained above. In particular, these can be transistors, preferably MOSFETs. However, it is also possible to design the switches as relays or contactors.

The switches have a current carrying capacity of over 100 A, especially over 200 A, preferably over 300 A. The switches can safely switch currents of over 100 A, preferably over 200 A, in particular over 300 A, without causing permanent damage to them. The switches can also be formed from a cascade of several semiconductor switches. Several semiconductor switches can also be connected in parallel so that the switching capacity of each individual switch is lower.

It can also be useful to design the switches with different switching capabilities and/or current carrying capacities. The first and the second switch can be of the same design, and the third switch can be of smaller dimensions, e.g. in terms of current carrying capacity and/or switching capability. Equalizing currents between the power supplies can also be up to 300 A, operating currents for a load e.g. only 10 to 50 A. The first two switches would be designed accordingly for 300 A current carrying capacity, the third switch for only 50 A.

According to an embodiment, it is proposed that the semiconductor switches are connected in such a way that their body diodes are wired in opposite directions at the first and second switches. This means that the current flow directions of the two body diodes are opposite. In particular, the current flow directions of the diodes are either pointing away from the node or pointing to the node. This excludes a current flow via the diodes from the first power supply to the second power supply and vice versa.

Starting from the node, the switching system is connected to the load via the third switch and preferably a single power cable. Between the node or the third switch and the load, an electronic control unit can also be provided for the load, which can be counted as belonging to the load according to the subject matter. The power cable can preferably be made of a copper material or an aluminium material. The power cable is in particular a shielded power cable. Preferably, the power cable is formed as a two-core cable, in which the mass return in the cable is also guaranteed and not, as is usually the case, realized via the chassis.

According to an embodiment, it is proposed that a mass return from the load to the respective power supplies is provided via the switching system. In this case, the main line strands are preferably two-wired and, in particular, shielded.

In addition to the switches, the switching system preferably has a current path for mass return so that the two-wired main line strands can also be connected to the switching system. In particular, both the power supply and the mass return are realized in the housing.

In the power supply, i.e. high-side, the switches are preferably provided and in the mass feedback, i.e. low-side, a short-circuit occurs between the electrical contacts of the switching system, in particular between the electrical terminals of the housing. This short-circuit preferably occurs via cables inside the housing. The housing is preferably also shielded and in particular electrically short-circuited with the shielding of the power cables. This ensures continuous shielding of the switching system.

It is also proposed, that the switches resp. switching system are arranged high-side, thus with positive potential of the energy supply. On the other hand, it can also be useful to connect the switches or the switching system on low-side to the power supplies. This can lead in particular to the advantage that the operating voltage for the switches, especially the semiconductor switches, does not have to be above the potential of the power supply. For a 12 V on-board power supply, the voltage at the switches must be higher when connected to high-side, e.g. 17 or 24 V, whereas for a low-side connection the supply voltage for the switches must only be 5 V or 12 V.

BRIEF DESCRIPTION OF THE DRAWINGS

In the following, the subject matter is illustrated in more detail using a drawing showing embodiments.

DESCRIPTION OF THE INVENTION

Figure 1:
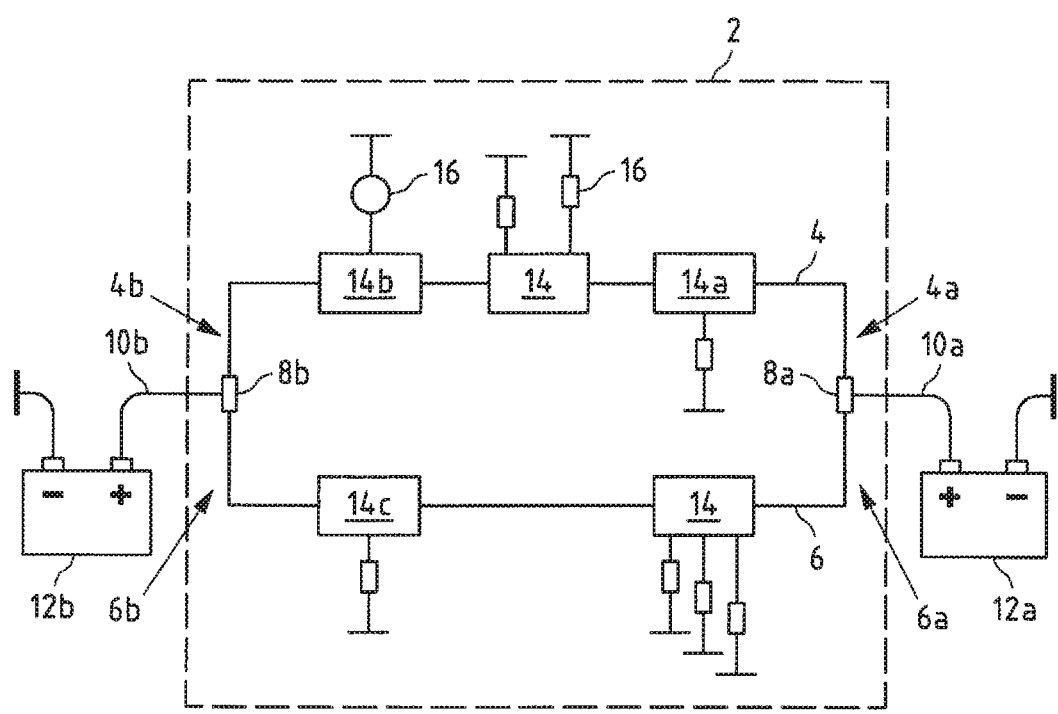
FIG. 1 is a vehicle electrical system according to an embodiment.

FIG. 1 shows a vehicle electrical system 2 with two main line strands 4, 6 connected electrically in parallel to each other. The main line strands 4, 6 are directly connected to each other at their distal ends 4a, 6a and 4b, 6b respectively. Starting from the connection point 8a, b, the main line strands 4, 6 are electrically connected via a preferably flexible cable 10a, 10b with one battery 12a, 12b each, which serve as on-board power supply.

Here the flexible cables 10a, 10b are each connected high-side with the respective batteries 12a, 12b.

The main line strands 4, 6 are interrupted by vehicle electrical system switching networks. Loads 16 are connected to the vehicle electrical system switching networks 14. Such loads may be, for example, a starter, hydraulic generators, brake boosters, steering wheel boosters, driving assistance systems or the like. It can be seen that one or more loads 16 can be connected in a vehicle electrical system switching network 14.

FIG. 1 also shows that the main line strands 4, 6 form a closed ring and are therefore at the same electrical potential. The two main line strands 4, 6 enable redundant operation of the loads 16. The electrical high-side potentials of the two batteries 12a, 12b are both connected to each load 16. If a main line strand 4, 6 fails, the electrical potential of at least one of the batteries 12a, 12b is always available for a load 16, so that the reliability is considerably increased.

The vehicle electrical system switching networks 14 have selectively switchable switches, as will be described below. During operation, for example, a main line strand 4 may be interrupted, for example in the area of the 14a vehicle electrical system switching network. In this case the main line strand 4a would still be connected to the battery 12a and directly to the battery 12b via the main line strand 6 and the loads would still be supplied with electrical energy. Even in the event of an additional failure, for example in the area of the vehicle electrical system switching network 14c, the remaining loads would still be supplied with electricity either via the battery 12a or the battery 12b. This means that even in the event of multiple failures along the main line strands 4, 6, a large number of loads 16 remain supplied with electrical energy.

Figure 2:
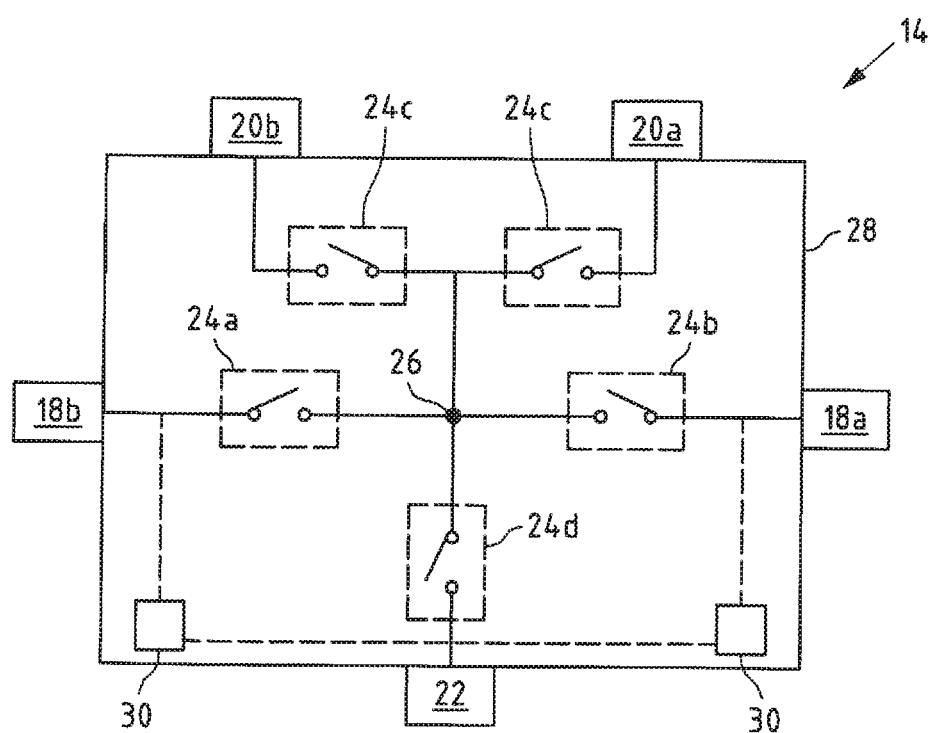
FIG. 2 is a vehicle electrical system switching network according to an embodiment.

FIG. 2 shows a vehicle electrical system switching network 14 in a schematic representation. The vehicle electrical system switching network 14 has two main line terminals 18a, 18b. In addition, the vehicle electrical system switching network 14 has one or more load terminals 20a, 20b. Finally, a cross line terminal 22 can be provided on a vehicle electrical system switching network 14.

The main line terminals 18a, 18b are connected via a first switch 24a and a second switch 24b to a common node 26. Starting from the common node 26, third switches 24c can branch off to the load terminals 20a, b. Furthermore, a fourth switch 24d can branch off from the common node 26 to a cross line terminal 22.

Communication devices 30 may be provided within a housing 28 of the vehicle electrical system switching network 14 which are permanently connected at least to the main line terminals 18a, b and optionally to the cross line terminals 22 and thus enable communication therewith.

In addition, a processor which is not shown is provided within a vehicle electrical system switching network 14, which is in active connection with the communication devices 30 and with the respective switches 24. Via the communication device 30, the microprocessor can receive errors and, if necessary, open or close each individual switch 24 individually. Furthermore, the processor can interrogate non-displayed sensors, for example to detect the switch status of switches 24, voltages, temperatures, currents or the like within the vehicle electrical system switching network 14. With the help of the recorded sensor values, the sensor can automatically open or close switch 24 or transmit the recorded values via the communication devices 30.

Switches 24 are preferably relays or main switches, especially MOSFETS or PROFETS.

Figure 3:
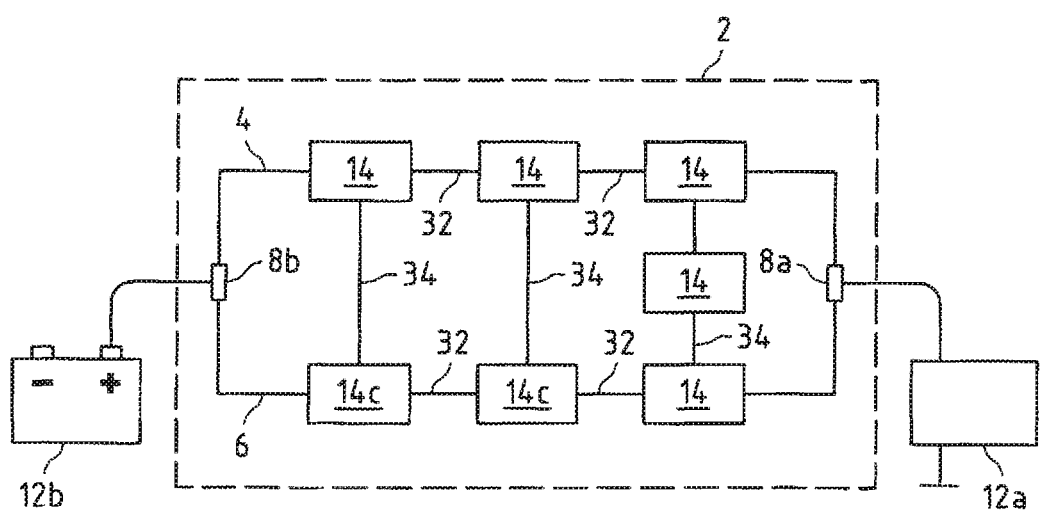
FIG. 3 is a vehicle electrical system for this vehicle according to another embodiment.

FIG. 3 shows a vehicle electrical system 2 with a slightly different design than FIG. 1. First of all, it can be seen that the vehicle electrical system power supply 12a is no longer formed as a battery, but as a generator, for example. In addition, for the sake of clarity, only FIG. 3 shows the line sections 32 between the vehicle electrical system switching networks 14. The line sections 32 are preferably identical to the sections of the main line strands 4, 6 in the area of the connection points 8a, 8b in their cross-section and profile.

It can also be seen that cross-line strands 24 are each arranged between two vehicle electrical system switching networks 14. The cross-line strands 34 can optionally be connected to the main line strands 4, 6 via the fourth switches 24d. The cross-line strands 34 enable a fully meshed distribution network, so that a connection of each individual load, which is connected to the vehicle electrical system switching networks 14, with each of the two vehicle electrical system power supplies 12a, 12b is ensured with the greatest possible probability. A vehicle motor vehicle electrical system switching network 14 may also be provided within a cross-line strand 34 and, if necessary, a load 16 may also be connected there.

It is understood that more than two main line strands 4, 6 can be laid parallel to each other within a motor vehicle, but for the sake of clarity only two main line strands 4, 6 are shown in FIGS. 1 and 3. If more than two main line strands 4, 6 are provided, cross link lines between two main line strands may be provided optionally. The cross line strands may be spatially separated from each other, for example one in a front part of the vehicle, e.g. in or on the engine compartment, and one in the rear part of the vehicle, e.g. in/on the rear or in/on the boot. By selectively closing and opening switches 24, optional connections can be made between the vehicle electrical system switching networks 14 and the vehicle electrical system power supplies 12a, 12b, and thus routes can be established in order to avoid faults or interruptions within the main line strands 4, 6 if necessary. This will massively increase the fault reliability of the vehicle electrical system, which will be particularly relevant in the field of electromobility and automotive driving.

REFERENCE SIGNS

- 2 Vehicle electrical system
- 4, 6 Main line
- 4a, b Distal end
- 6a, b Distal end
- 8a, b Connection point
- 10a, b Flexible cable
- 12a, b Battery
- 14 Vehicle electrical system switching network
- 16 Loads
- 18a, b Main line connection
- 20a, b Load connection
- 22 Cross-line connection
- 24 Switches
- 26 Node
- 28 Housing
- 30 Communication unit
- 32 Cable section
- 34 Cross-line strand

The invention claimed is:

1. A motor vehicle electrical system comprising:
   at least two main line strands arranged electrically parallel to one another, the at least two main line strands being electrically short-circuited with one another in two regions separated from one another and each having a connection for one of at least two on-board power supplies wherein the two regions are connected to the at least two on-board power supplies with a same polarity,
   at least one motor vehicle electrical system switching network being arranged in each of the at least two main line strands interrupting the respective main line strand, the at least one motor vehicle electrical system switching network having at least four switches, wherein
   a first switch is disposed between a first main line strand terminal and a common node,
   a second switch is disposed between a second main line strand terminal and the common node,
   at least one third switch is arranged between the common node and each of a plurality of load terminals, and
   at least one fourth switch arranged between a cross-line strand terminal and the common node, wherein a cross-line strand that connects the at least two main line strands is connected to the cross-line strand terminal, wherein each load terminal of the plurality of load terminals is connected to a single load, and wherein each of the at least two main line strands are coupled to a communication device, wherein the communication device provides redundant communication by emitting switching commands for one switch on a first main line strand and for another switch on a second main line strand, such that the motor vehicle electrical system switching networks are controlled via Powerline Communication.

2. The motor vehicle electrical system according to claim 1,

Wherein at least one of the at least two main line strands is formed from at least three line sections, at least one of the at least three line sections being arranged between two motor vehicle electrical system switching networks.

3. The motor vehicle electrical system according to claim 1, wherein line sections of one of the at least two main line strands are connected to the first main line strand terminal and the second main line strand terminal.

4. The motor vehicle electrical system according to claim 1, wherein the at least two main line strands are short-circuited with one another in a region of their respective distal ends.

5. The motor vehicle electrical system according to claim 4, wherein the main line strands are directly connected with one another in the region of the short-circuit.

6. The motor vehicle electrical system according to claim 1, wherein the at least two main line strands are connected to one another via at least one cross-line strand.

7. The motor vehicle electrical system according to claim 1, wherein the at least two main line strands and cross-line strands form, at least in parts, a meshed distribution network.

8. The motor vehicle electrical system according to claim 7, wherein the at least two main line strands and the cross-line strands form a fully meshed distribution network.

9. The motor vehicle electrical system according to claim 1, wherein at least one line section and/or at least one cross-line strand is formed as a flat cable.

10. The motor vehicle electrical system according to claim 9, wherein the flat cable is made of a solid material.

11. The motor vehicle electrical system according to claim 10, wherein the flat cable is made from a copper material or an aluminum material.

12. The motor vehicle electrical system according to claim 1,

Wherein the first switch, the second switch, and the at least one third switch are individually controllable.

13. The motor vehicle electrical system according to claim 1,

Wherein the at least one motor vehicle electrical system switching network has a current sensor and/or a voltage sensor and/or a temperature sensor, and in that at least one of the at least four switches is controlled as a function of a sensor signal.

14. The motor vehicle electrical system according to claim 1, one of the at least two on-board power supplies is formed as one of a battery, an accumulator, a DC/DC converter, or a generator.

15. The motor vehicle electrical system according to claim 1, wherein the single load is connected to a load terminal of the plurality of load terminals via a single power cable.

16. A motor vehicle comprising the motor vehicle electrical system of claim 1 and the at least two on-board power supplies and one load.

* * * * *